(12) United States Patent
Annis

(10) Patent No.: US 7,561,666 B2
(45) Date of Patent: Jul. 14, 2009

(54) PERSONNEL X-RAY INSPECTION SYSTEM

(76) Inventor: Martin Annis, 67 Banks St., Cambridge, MA (US) 02138

( * ) Notice: Subject to any disclaimer, the term of this patent is extended or adjusted under 35 U.S.C. 154(b) by 38 days.

(21) Appl. No.: 11/838,783

(22) Filed: Aug. 14, 2007

(65) Prior Publication Data

US 2008/0043913 A1 Feb. 21, 2008

Related U.S. Application Data

(60) Provisional application No. 60/837,838, filed on Aug. 15, 2006, provisional application No. 60/875,630, filed on Dec. 19, 2006.

(51) Int. Cl.
*G01N 23/203* (2006.01)
(52) U.S. Cl. ...................................... 378/87
(58) Field of Classification Search ................... 378/57, 378/86, 87, 88, 89
See application file for complete search history.

(56) References Cited

U.S. PATENT DOCUMENTS

| | | | |
|---|---|---|---|
| 4,284,895 A * | 8/1981 | Morgan et al. ............. 378/9 |
| 5,224,144 A * | 6/1993 | Annis ........................ 378/87 |
| 6,175,615 B1* | 1/2001 | Guru et al. ................. 378/149 |
| 6,459,764 B1* | 10/2002 | Chalmers et al. ............. 378/86 |
| 2007/0030955 A1* | 2/2007 | Eilbert et al. ................. 378/87 |

* cited by examiner

*Primary Examiner*—Chih-Cheng G Kao
(74) *Attorney, Agent, or Firm*—Altman & Martin; Steven K Martin

(57) ABSTRACT

A dual-energy x-ray source located a distance of one half of the maximum width of the subject from the subject emits a cone beam to a horizontal slit in an x-ray-blocking sheet, producing a fan beam that is chopped into a pencil beam by a rotating disk with radial slots. The pencil beam sweeps a subject, producing backscatter read by a plastic scintillator detector situated very close to and curved around the sides of the subject. The entire assembly translates vertically to produce a complete image of the subject. Pencil beam area is increased farther from the center by increasing the width of the slit toward both ends and increasing the width of the slots toward the outer end. High and low peak x-ray energies of 50 KeV or more and 30 KeV or less, respectively, enable differentiation between innocent and contraband materials that both contain low Z materials.

8 Claims, 11 Drawing Sheets

PERSONNEL X-RAY INSPECTION SYSTEM

CROSS-REFERENCES TO RELATED APPLICATIONS

The applicant wishes to claim the benefit of U.S. Provisional Patent Application No. 60/837,838, filed Aug. 15, 2006 for BACKSCATTER PERSONNEL SYSTEM in the name of Martin Annis, and U.S. Provisional Patent Application No. 60/875,630, filed Dec. 19, 2006 for METHOD TO USE A DUAL ENERGY X-RAY SOURCE IN A BACKSCATTER BODY SCAN SYSTEM in the name of Martin Annis.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to imaging systems, more particularly, to personnel body scan systems for the detection of contraband, such as explosives, guns, and the like.

2. Description of the Related Art

Backscatter x-ray systems have been in use for at least three decades. The low x-ray energy version of these systems typically use a scanning pencil beam of x-rays. A cone beam of x-rays emitted by an x-ray source impinges on a fixed horizontal slot to form a horizontal fan beam. The fan beam impinges on radial slits in the vertically rotating disk to produce the pencil beam that scans horizontally across the person. The x-rays in the pencil beam penetrate the clothing of the person with very little absorption and are absorbed or scattered by the much thicker body. The x-rays scattered from each location along the scan line are detected by a large area backscatter detector and form one horizontal line of the image. The entire assembly, including the x-ray source, the pencil beam-forming mechanism and backscatter detector, is then translated vertically to form a two-dimensional image of the entire body. Contraband is seen as an area of contrast on top of the body image.

The peak x-ray voltage is chosen to be large enough to penetrate the person's clothing and small enough so as to not penetrate the person's body excessively. Thus the images appear to strip the person of his clothing. Low atomic number (low Z) materials, e.g., explosives, scatter back more X-rays, so they are seen as white. High atomic number (high Z) materials, e.g., guns, scatter back very few x-rays, so they are seen as black.

The United States government has established a maximum incident x-ray flux that is permitted for these systems of 10 microRoentgens (µRoentgens) per inspection measured as defined in the regulation. This restriction on the incident flux limits both the contrast and spatial resolution of these systems. Thus the image quality of the current state-of-the-art systems is poor. Thin and/or small area threats are difficult to identify or even to detect.

Backscatter imaging systems have the disadvantage of limited penetration of the subject because of the use of a pencil beam containing only a small fraction of the x-ray source emission, the relatively small probability of the scatter event and the requirement that the lower energy scattered x-ray photons must penetrate back through the subject. In the case of personnel backscatter systems, this latter requirement is not important because the contraband is located on the surface of the person's body.

Despite these disadvantages, backscatter systems for packages have a significant market because the images have a three-dimensional quality that is very pleasant to the operator.

The use of dual energy in transmission x-ray inspection systems is well known. These systems image the subject almost simultaneously with two x-ray fan beams of differing peak x-ray energies. They typically use one beam of lower peak energy of about 70 KeV and another beam of higher peak energy of about 150 KeV. The lower peak energy must be high enough to penetrate the package and low enough to differentiate between explosives or drugs and innocent plastics of nearly the same atomic number, Z. The typical requirement is to differentiate plastics and other common materials that do not contain any elements with Z>8, the atomic number for oxygen, and drugs or explosives that have the same low Z elements in different proportions and typically a large fraction of nitrogen, Z=7, a common component of drugs and explosives. These low Z elements differ very little in their attenuation of x-rays except for x-rays of very low energies, hence the need for an x-ray beam of low peak energy. The dual-energy systems using transmission x-rays do not work very well unless the thickness of the package being inspected is less than 5 cm of material of density 1 $g/cm^2$, since the lower energy beam is rapidly absorbed.

BRIEF SUMMARY OF THE INVENTION

An object of the present invention is to provide a personnel inspection system that detects contraband better than systems of the prior art while using less power.

The system of the present invention has an x-ray source that emits a cone beam to a horizontal slit in an x-ray-blocking sheet. The slit produces a fan beam that is directed to an x-ray-blocking rotating disk in which there are four radial slots. As the disk rotates, each slot traverses the slit, forming the fan beam into a rapidly moving pencil beam that sweeps horizontally across the subject. The x-rays in the pencil beam strike the subject and are scattered backwards into the backscatter detector. A processor reads the detector signals to form a line image along the horizontal line. An assemblage of the x-ray source, slit sheet, rotating disk, and detector translates vertically to produce a complete image of the subject.

The detector uses a plastic scintillator that is about 5 cm thick and is curved around the sides of the subject. The large thickness of the plastic scintillator detection region relative to the scintillating screens of the prior art results in a detection efficiency of about 60%. The small total thickness of the plastic detector relative to the total thickness of the detectors of the prior art allows the distance between the source and subject to be much shorter. The curvature of the scintillator increases the solid angle subtended by the pencil beam near the side of the subject, thereby providing an additional increase in efficiency. Finally, the detector is situated very close to the subject, thereby improving the spatial resolution. The efficiency of the backscatter detector is 0.63, about four times greater than prior art systems.

In the prior art systems, the x-ray flux decreases significantly at the edges of the image due to the increased distance traveled by the pencil beam and the increased angle of the pencil beam toward the edges of the image. This results in a flux intensity decrease that is proportional to the $cos^3$ of this angle. This flux intensity decrease is compensated for in the present invention by increasing the area of the pencil beam by increasing the width of the fixed slit toward both ends and by increasing the width of the slots from the inner end to the outer end.

Another feature of the invention is that the x-ray source is placed as close as possible to the subject. It is assumed that the maximum width of a person to be inspected is about 70 cm. From the outer edges of that person, two 45° lines are drawn that intersect at the x-ray source and defines a fan beam of 90°. This indirectly determines the distance from the x-ray source to the nearest surface of the subject, which is only 20 cm in the present design, substantially less than prior art systems. This allows the use of a much lower power x-ray tube, which reduces the power required to reach the federally-mandated maximum permissible dose of 10 μRoentgen. In the present design, the required power of the x-ray source is about 200 watts.

The present invention employs a dual-energy x-ray source with a high peak x-ray energy of greater than 50 KeV and a low peak x-ray energy not more than 30 KeV. The key is that the lower energy be as low as possible to be able to differentiate between the innocent low Z materials and contraband that may also contain only low Z materials. Also the lower energy must be high enough to penetrate the clothing without too much absorption relative to the contraband and the body.

One measure of the effectiveness of the system is the contrast, determined as the number of standard deviations (SD's), between a thin phantom hidden on the surface of the subject and the surrounding soft tissue. In the present system, this is shown below to be 11.5 standard deviations for a small sample threat.

Another measure that quantifies the system is the average solid angle subtended by the x-ray backscatter detector at a point on the surface of the subject. This solid angle is calculated as 5 steradians, about ten times greater than prior art systems.

The present invention increases the x-ray flux used in the formation of the backscatter image by as much as a factor of 50 over existing personnel x-ray inspection systems, thus allowing increased contrast and spatial resolution of the images. Threats are therefore more accurately evaluated and future smaller threats, such as chemical and biological materials may be seen.

The present invention has application to x-ray systems used in any application where the aim is to identify materials that are not shielded significantly by overlying material, such as the evaluation of potential tumors just below the surface of the skin.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present invention includes a number of aspects. First, the compact design that brings the person being inspected very close to the backscatter detector increases the usable x-ray flux in the image by about a factor of five without exceeding the government-mandated maximum dose of 10 μRoentgens by increasing the solid angle subtended by the backscatter detector. Second, the use of a plastic scintillator for the backscatter detector increases the usable flux by about a factor of four due to the improved stopping power of the thicker detector. Third, an additional factor of two in usable flux is a result of the uniform efficiency of light photon collection by the placement of the photo multipliers away from the electron beam. Fourth, the use of a shaped slot and shaped slits to form the x-ray pencil beam, described below, results in an additional factor of nearly two increase toward the outer edges of the person.

There is a fundamental difference between the requirements of a baggage inspection system and a body scan system which makes the present invention possible. In the case of baggage inspection, the requirement is to detect contraband anywhere in the package. In the case of a body scan system, the requirement is to detect any contraband on the surface of the body. This means that the lower of the dual-energy x-rays need only penetrate the clothing and identify the material behind the clothing and on the surface of the body. This allows the use of a much lower peak energy for the low energy beam of the two energies. Therefore, a peak energy for this lower energy beam that is only capable of penetrating the clothing twice, on the way in and backscattered on the way out, is used. This energy must be less than 30 KeV. The only way to discriminate between the low Z (atomic number) materials that make up both innocuous plastics and explosives is the slight differences in Z and the slight differences in density. The lower peak energy provides greater contrast due to the fact that the absorption of the x-rays due to the photoelectric effect is enhanced for low Z materials at lower x-ray energies.

Figure 5:
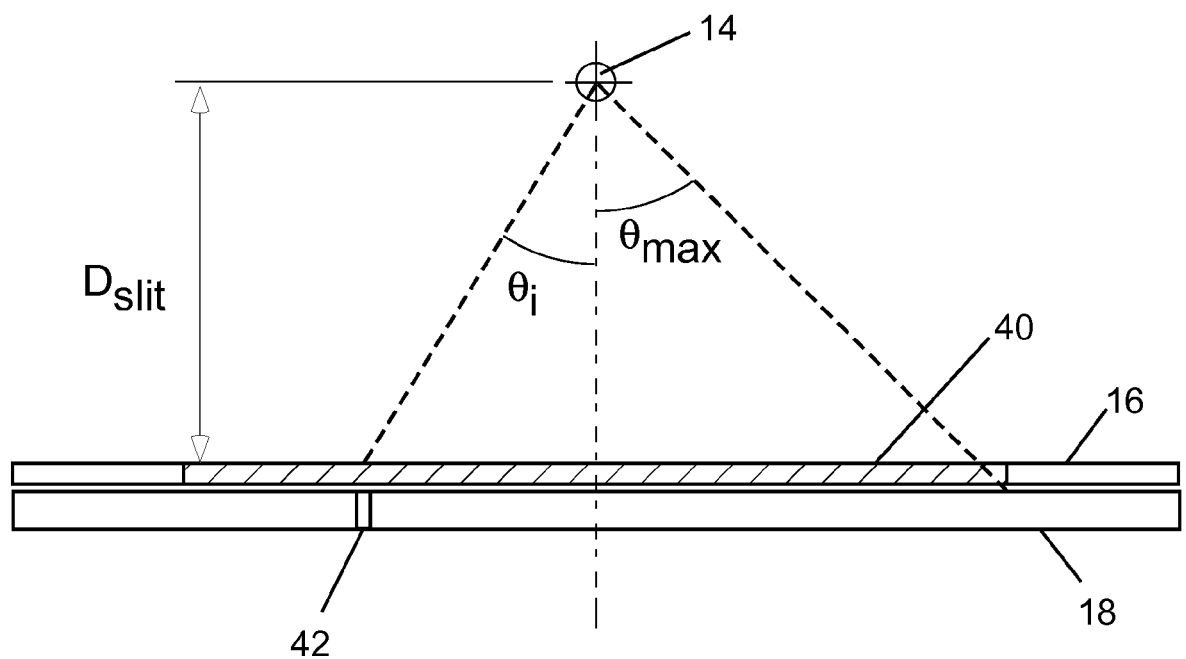
FIG. 5 is a top view of the arrangement of the fixed slit and rotating slots that produce the pencil beam.
Figure 6:
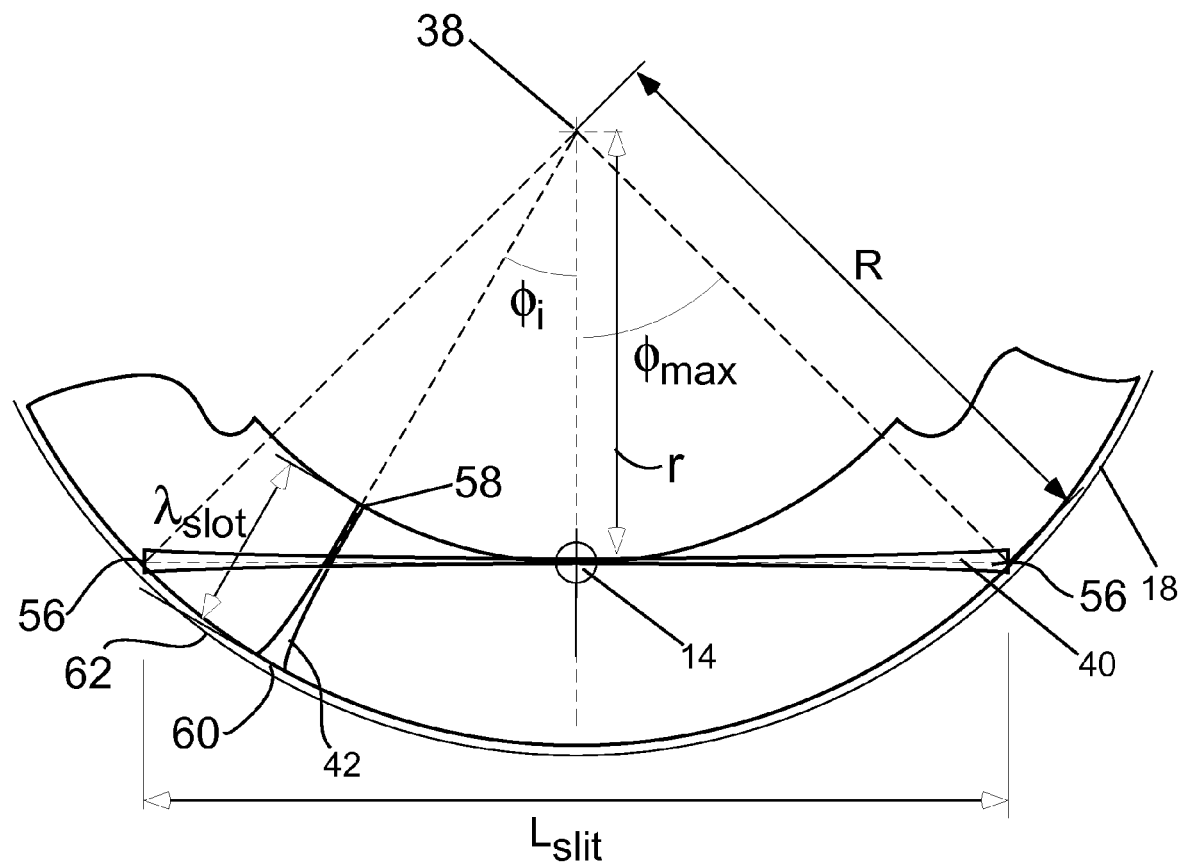
FIG. 6 is a front view of the arrangement of the fixed slit and rotating slots that produce the pencil beam.
Figure 7:
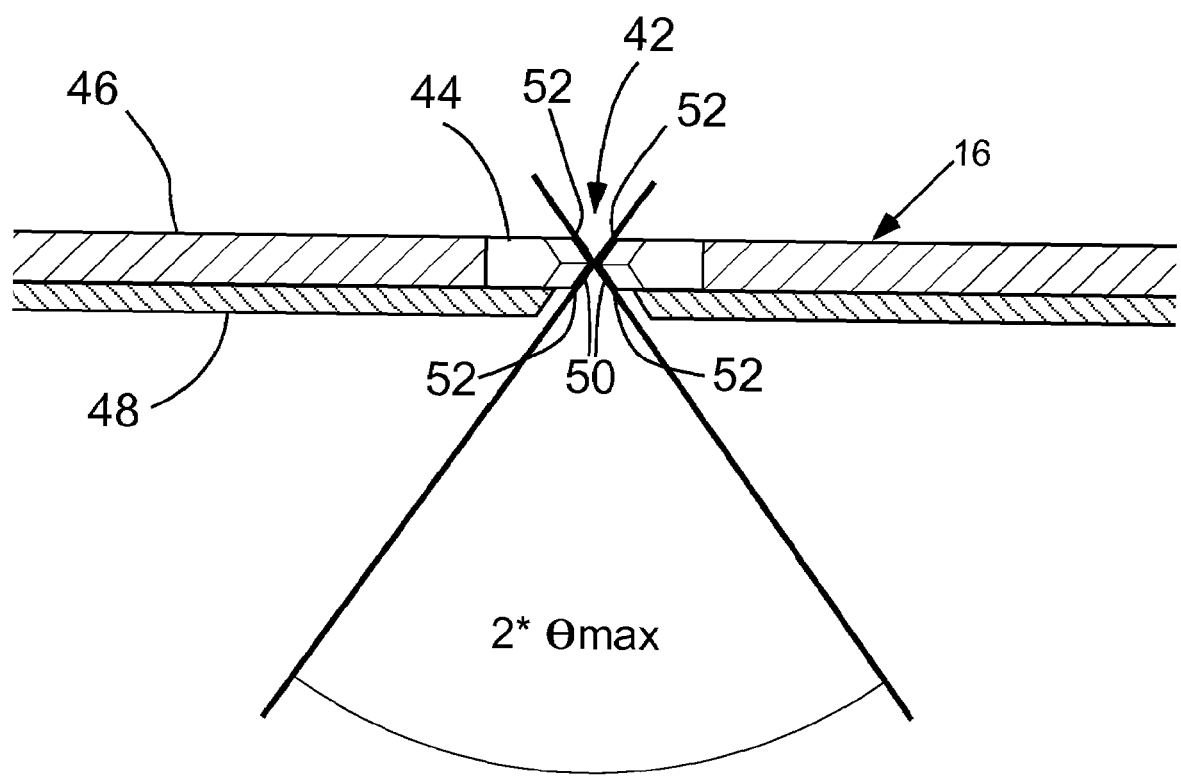
FIG. 7 is a cross-sectional view of each of the rotating slots of FIG. 6.

The present invention employs a system 10 for scanning a subject 12 via x-rays. The basic design of the system 10 is shown in FIGS. 1-7. An x-ray source 14 emits a cone beam 22 at a horizontal slit 40 in a lead sheet 16 with tungsten jaws fixed relative to the x-ray source 14. The slit 40 produces a fan beam 24 from the cone beam 22. On the fan beam side of the sheet 16 is a rotating disk 18 of lead 46 and iron 48 parallel to the sheet 16 in which there are four radial slots 42 formed by tungsten jaws 44, as shown in FIG. 7. As the disk 18 rotates about its axis 38, each slot 42 traverses the slit 40, forming the fan beam into a rapidly moving pencil beam 26 that sweeps horizontally across the subject 12. The x-rays in the pencil beam 26 are scattered backwards, as at 28, from the subject 12 into the backscatter detector 20. The single backscatter detector 20 senses the backscatter x-rays 28. A processor reads the signals generated by the detector 20 to form a line image along the horizontal line. The position of the pencil beam along the slit establishes the location of the relevant pixel. An assemblage 30 of the x-ray source 14, slit sheet 16, rotating disk 18, and detector 20 translates vertically, as at 36, to produce a complete image of the subject 12.

The detector 20 uses a plastic scintillator that is about 5 cm thick, rather than the 1 mm thick scintillating screens of the prior art. The detector 20 is in two sections, with the scintillator 66 between the x-ray source 14 and the subject 12 and the detectors 68 at the ends of the scintillator 66, allowing the pencil beam of x-rays to reach the body by penetrating only the scintillator. The large thickness of the plastic scintillator relative to a scintillating screen results in a detection efficiency of about 60%, a large improvement over the prior art scintillating screens. The small 5 cm total thickness of the detector 20 is important to the design of the system. Prior art total detector systems are quite thick, on the order of 30 cm. The small thickness of the detector 20 used in the present invention allows the distance from the x-ray source to surface of the person to be much shorter.

Figure 1:
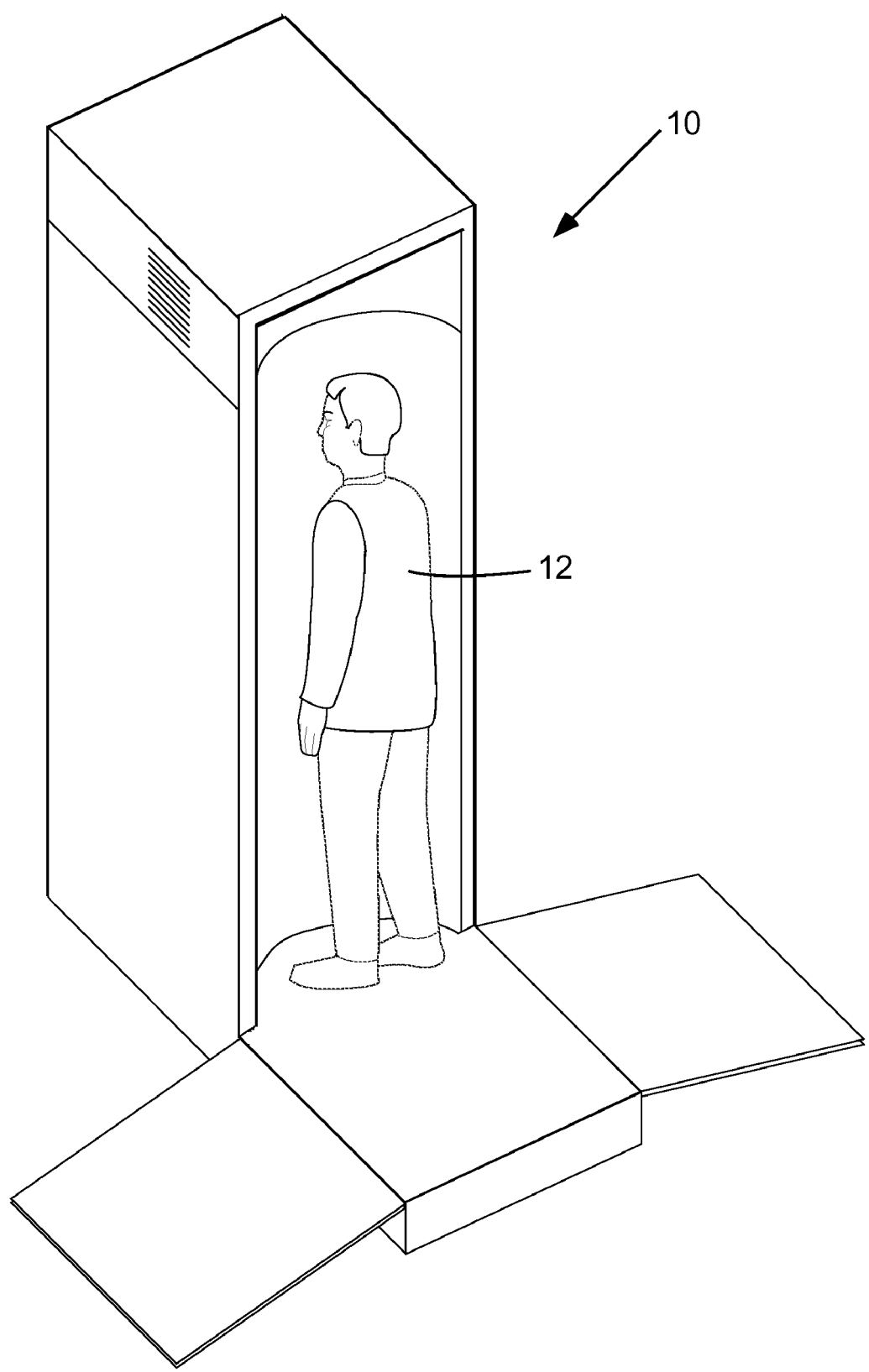
FIG. 1 is a perspective view of the system of the present invention.
Figure 2:
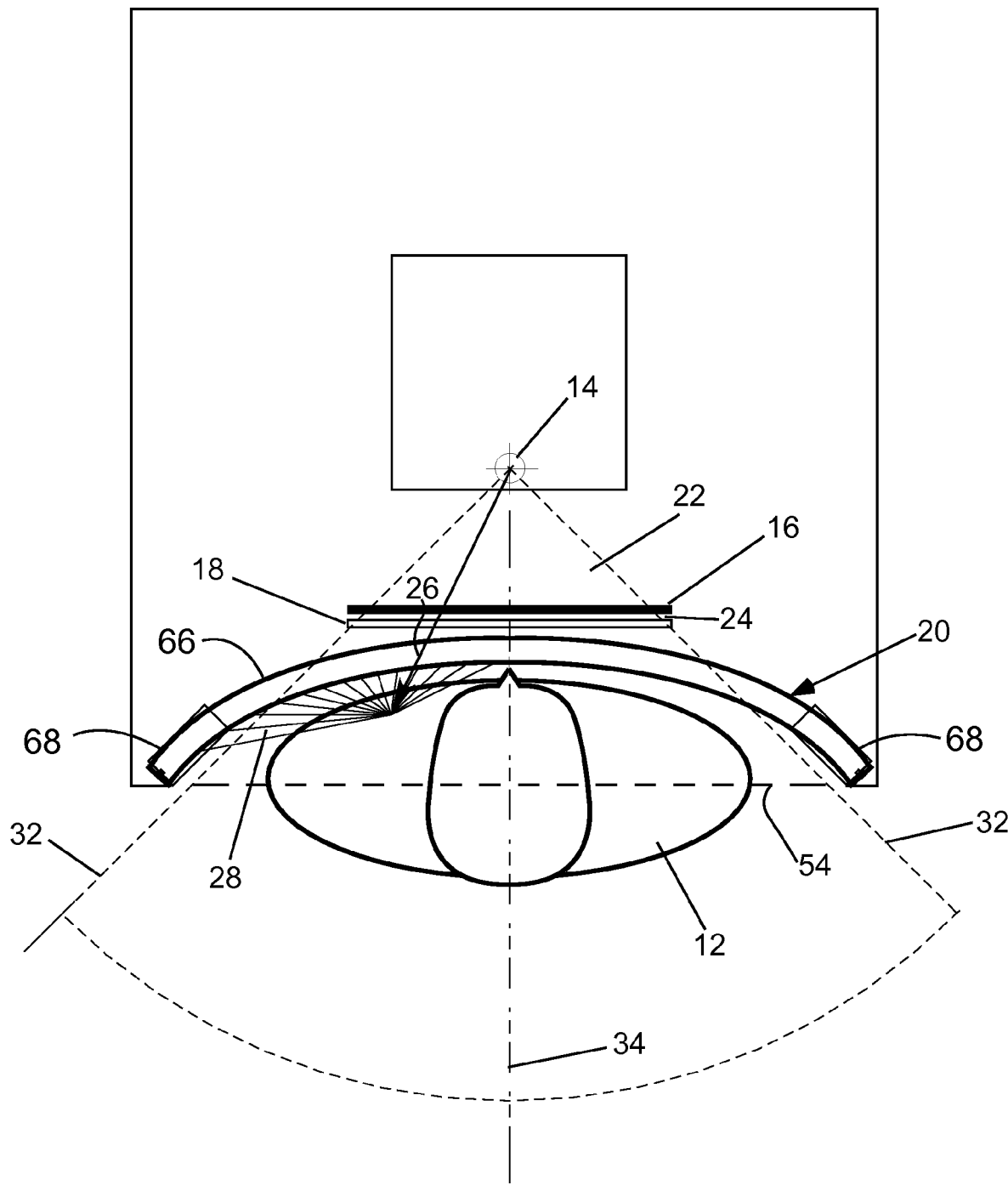
FIG. 2 is a top view of the major components of the system of FIG. 1.
Figure 3:
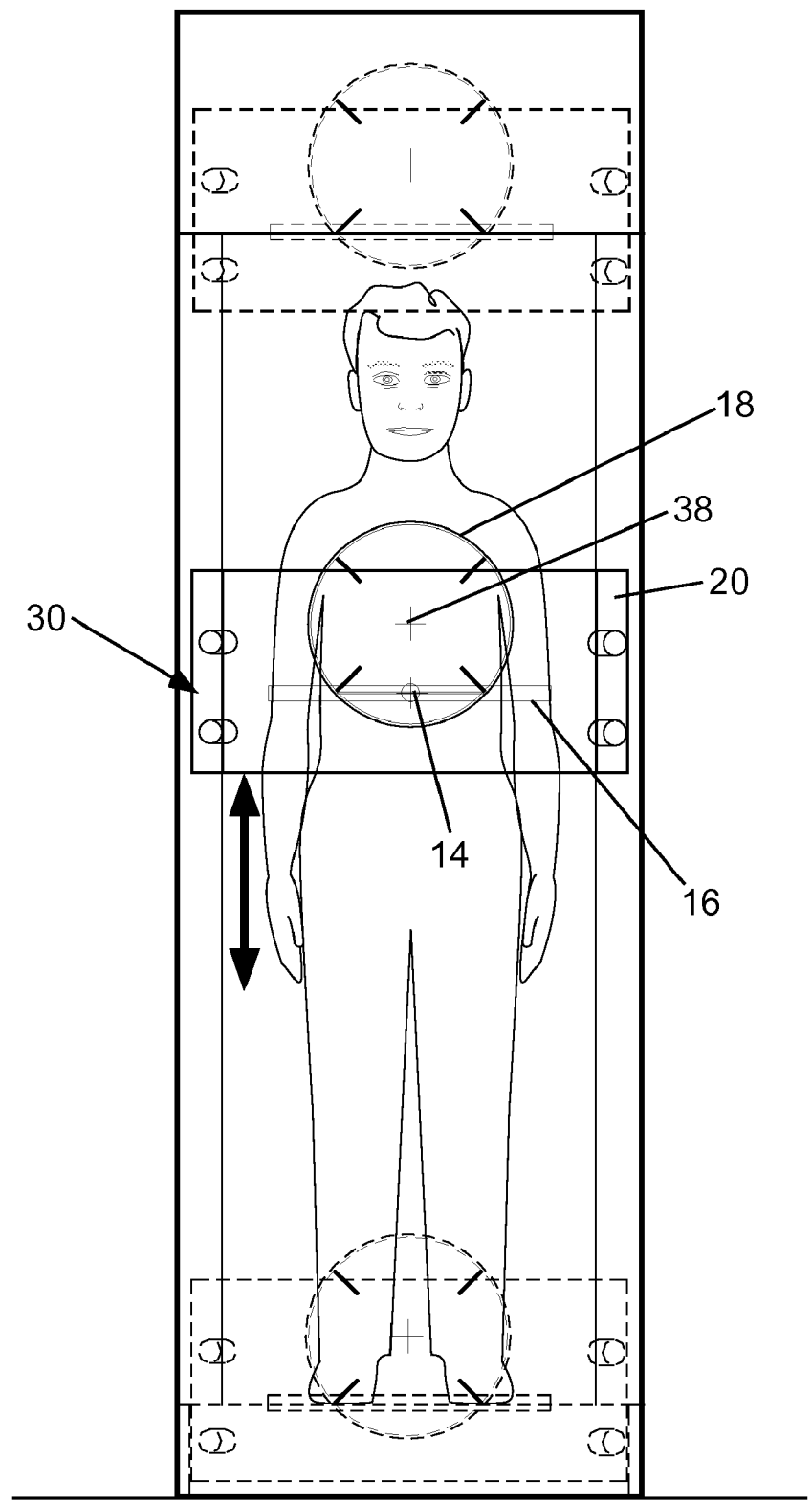
FIG. 3 is a front view of the major components of the system of FIG. 1.
Figure 4:
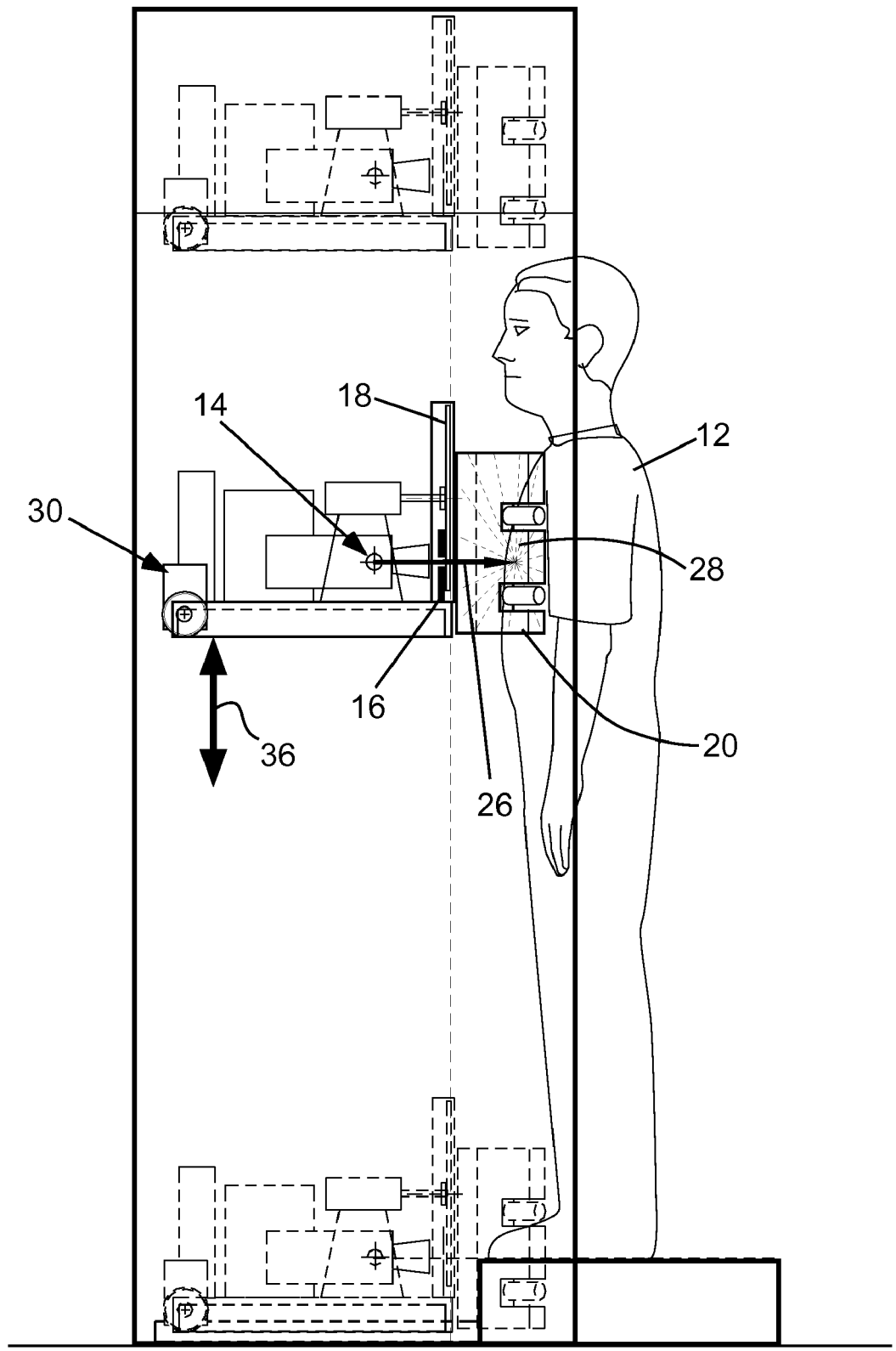
FIG. 4 is a side view of the major components of the system of FIG. 1.

The detector 20 is curved, as shown in FIG. 2, so as to be close to the sides of the subject 12, as well as the front of the subject 12. The curvature of the detector 20 increases the solid angle subtended by the pencil beam area of the subject 12 as the pencil beam 26 intersects near the side of the subject 12. This provides an increased efficiency of detection near the side of the subject 12. Finally, the detector assembly 20 is situated very close to the subject 12, thereby improving the spatial resolution and contrast.

Figure 8:
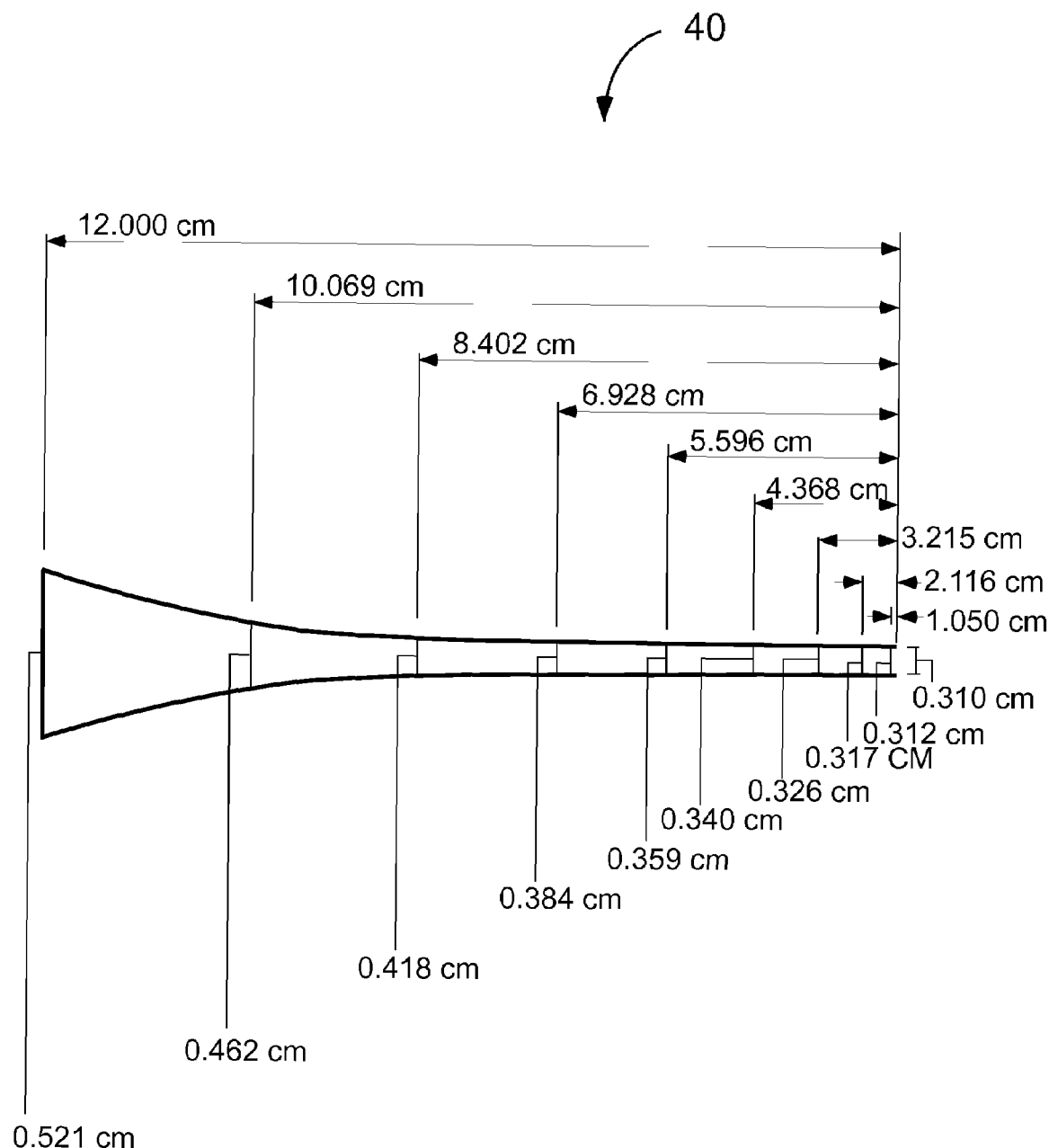
FIG. 8 is a detailed view of the width of the fixed slit as it varies along the length of the slit.
Figure 9:
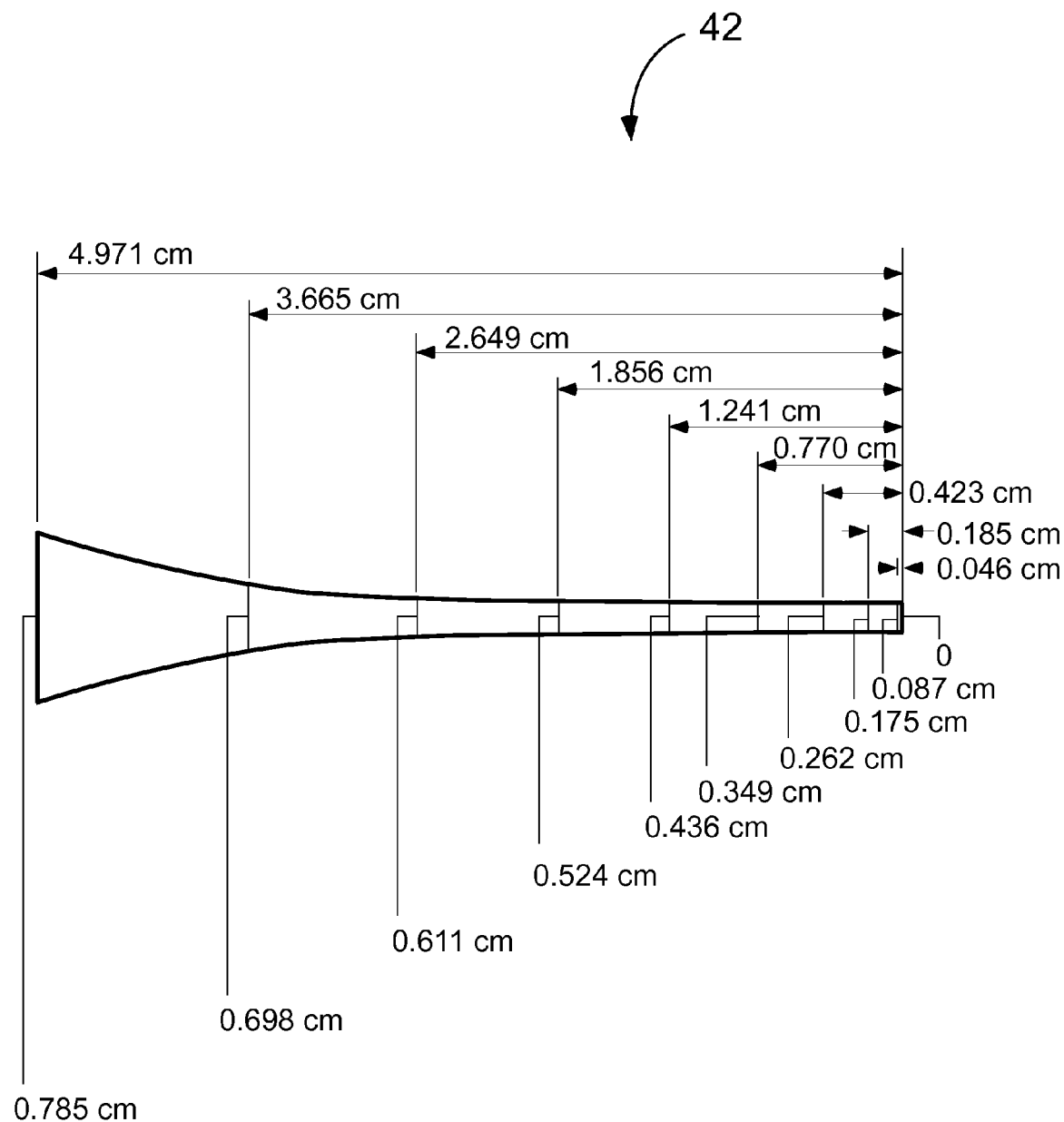
FIG. 9 is a detailed view of the width of the rotating slot as it varies along the length of the slot.

In the prior art systems, the x-ray flux decreases significantly at the edges of the image due to the increased distance traveled by the pencil beam. Likewise, the angle, $\Theta$, of the pencil beam 26 with the normal to the rotating disk 18 and the fixed slit 40 that forms the pencil beam 26 increases at the edges as shown in FIG. 2, so the intensity of the flux decreases proportionally to the $\cos^3$ of this angle, $\Theta$. This decrease in flux at the edges of the image is compensated for in the present invention by increasing the width of the fixed slit 40 toward both ends 56 and by increasing the width of the slots 42 from the inner end 58 closest to the disk axis 38 to the outer end 60 on the periphery 62 of the rotating disk 18. The increase in the slit and slot widths is seen in FIGS. 6, 8, and 9 and is described in detail below.

Another feature of the invention is to place the x-ray source 14 as close as possible to the subject 12 being inspected. The design concept begins with the maximum width of a person to be inspected which is taken to be about 70 cm. From the outer edges of that widest person, two lines 32 are drawn at 45° angles from center 34, as shown in FIG. 2. The intersection of these lines at the x-ray source 14 defines a fan beam of 90°, the estimated maximum practical angle of currently available x-ray sources. This determines the closest usable distance from the x-ray source 14 to the plane 54 of the maximum width of the subject 12. This, in turn, determines the distance from the x-ray source 14 to the nearest surface of the subject 12. In the present design, this distance is only 20 cm, substantially less than prior art systems, allowing the use of a much lower power x-ray tube. In addition, the rotating disk 18, the fixed slit 40, and the required shielding are also smaller and lighter, thereby reducing the cost of the system.

A typical implementation of the invention uses an off-the-shelf, inexpensive x-ray source 14 with a spot size of about 1 mm. With this choice of x-ray source 14, the widths of the slit 40 and slot 42 must also be a minimum of 1 mm in order that the x-ray flux in the pencil beam 26 is not reduced. In the present design this width is about 3.1 mm, as described below. The rotating disk 18 with the slots 42 and the sheet 16 with the fixed slit 40 must also be sufficiently close to the subject 12 so that the pencil beam 26 is less than 4 mm across at the subject 12. The Nyquist theorem permits a sample every 2 mm, thereby achieving a 2 mm spatial resolution.

Placing the x-ray source 14 as close as possible to the subject 12, as described above, reduces the power required to reach the federally-mandated maximum permissible dose of 10 μRoentgen. In the design shown in the figures, the required power of the x-ray source 14 is about 200 watts, less than corresponding systems with equivalent performance. Despite the reduction in power, the system of the present invention performs better than prior art systems.

The system is capable of providing 2 mm pixels. Therefore a person that is 198 cm tall and 60 cm wide has approximately 300,000 total 2 mm pixels over the entire inspection area.

The present system uses a dual-energy x-ray source with a high peak x-ray energy of 100 KeV and a low peak x-ray energy of 30 KeV. The higher energy can be anything above 50 KeV without substantially changing the performance of the invention. A key element of the invention is that the lower of the two energies be as low as possible to be able to differentiate between the innocent low Z materials and contraband that may also contain only low Z materials. In addition the lower energy must be of sufficient intensity and peak energy to penetrate the clothing without too much absorption relative to the contraband and the body. Further this must be accomplished without exceeding the current federal limit of 10 μRoentgens per inspection, as defined in the federal regulations.

The major process by which low atomic number (Z) elements remove x-rays from the primary x-ray pencil beam is Compton scattering, a fraction of which is scattered backwards into the detector, and Compton absorption. This process is proportional to the total number of electrons per unit mass of the material and is very nearly the same, or independent of Z, for all materials in the low Z range except for hydrogen which has twice the density of electrons than the other materials. In addition, there is a small attenuation of the x-ray beam due to the photoelectric (PE) effect which removes the x-ray completely from the beam. This effect is proportional to $Z^2$ and is the main differentiation between materials. Since the K edge for absorption for low Z elements is less than 1 KeV and the PE absorption coefficient falls off approximately as the cube of the x-ray energy above this value, it is important to use a lower peak energy that is as low as possible.

The following items are calculated below (The difference between the effective dose in Rem and measured exposure in Roentgen is ignored in this calculation, which is a conservative assumption, and, in any event, does not significantly affect the result of the calculation.):

1. The power, W, of the x-ray tube required to achieve a dose, $F_{inc}$, of less than 10 μRoentgen, at the subject. This power is 200 Watts.

2. The efficiency, eff, of the backscatter detector. This efficiency is eff=0.63, about four times greater than prior art systems.

3. The number of standard deviations (SD's), or the contrast, between a thin phantom hidden on the surface of the subject and the surrounding soft tissue. This number, 11.5 SD's, is a measure of the effectiveness of the system.

4. The average solid angle, $\Omega$, subtended by the x-ray backscatter detector at a point on the surface of the subject. This solid angle is $\Omega$=5 steradians, about ten times greater than prior art systems.

5. The width of the fixed slit and each of the rotating slots as a function of the distance along their lengths. This variation in width allows the pencil beam x-ray flux to remain constant as the beam moves across the subject.

The calculations start with the following parametric values based on the current system design. $D_{slit}$ is the distance from the x-ray source to the slit/slot and is $D_{slit}$=12 cm. $L_{slit}$ is the length of the fixed slit and is $L_{slit}$=24 cm. $\Phi_{max}$ is one half of the angle between neighboring slots in the plane of the rotating disk and is ($\Phi_{max}$=45×($\pi$/180) radians. $D_{per}$ is the distance from the x-ray source to the surface of the subject and is $D_{per}$=20 cm.

The total area, $A_{tot}$, to be inspected is determined by the area as defined by the length of the fixed slit, $L_{slit}$=24 cm, and the height of the scan, $H_{scan}$=198.12 cm (78 inches), at the distance of the slit/slot, $D_{slit}$, from the source. So $$A_{tot}=L_{slit} \times H_{scan}=4.755 \times 10^3 \text{ cm}^2.$$

The area of the pencil beam at the subject is $$A_{pb} = 0.4^2 \text{ cm} = 0.16 \text{ cm}$$

at the subject. If it is assumed that the x-ray tube operates at W=200 Watts and V=100 kVp, then $$I = W/V = 2 \times 10^{-3} A.$$

The Health Physics and Radiologic Health Handbook, Revised edition, page 195, gives the emitted flux, F, in R/mA/min, as a function of kVp for a typical x-ray tube at 1 meter. For a peak voltage of 100 kVp, the emitted flux at 1 meter is $F_{1,1} = 0.564$ R/min/mA. So the incident flux at the front of the slit/slot at 100 kVp is $$Fincslit := F_{1,1} \cdot \left(\frac{100}{Dslit}\right)^2 \cdot \frac{I \cdot 10^3}{60}$$

or $$F_{incslit} = 1.306 \, R/\text{sec}.$$

The flux that comes thru the slit/slot and reaches the front of the subject is $$F_{incpersec} = F_{incslit} \times A_{pb} \times (D_{slit}/D_{per}) R/\text{sec/pencil beam}.$$

The total exposure time, $T_{pb}$, for each pencil beam is the total inspection time, $T_{inspect}$ divided by the number of pencil beams, $N_{beams}$. The number of pencil beams is $$N_{beams} = A_{tot} D_{per}/(A_{pb} \times D_{slit}) = 4.953 \times 10^4.$$

If $T_{inspect} = 3$ sec, then $$T_{pb} = T_{inspect}/N_{beams} = 6.057 \times 10^{-5} \text{ sec}.$$

If the time for the inspection is $T_{inspect} = 3$ sec, the total incident flux at the subject, $F_{inc}$, is $$F_{inc} = F_{incpersec} \times T_{pb} = 7.591 \times 10^{-6} R = 7.591 \, \mu R.$$

The regulation flux, $F_{reg}$, taken at a distance of 30 cm from the exterior wall of the system is $$Freg := Finc \cdot \frac{Dper + 2}{Dper + 2 + 30}$$

or $$F_{reg} = 3.212 \times 10^{-6} R = 3.212 \, \mu R.$$

It can be seen, therefore, that an x-ray tube that operates at 200 W is adequate in the present system without exceeding the government-mandated maximum of 10 µR.

If the average energy of a photon is V/2*0.001 MeV, the number of photons in the backscattered pencil beam, $N_{pb}$, (using the formula in the American Institute of Physics Handbook, third edition, page 8-305) is $$Npb := Finc \cdot \frac{2.15 \cdot 10^9 \cdot Apb}{\frac{V}{2} \cdot .001}$$

or $$N_{pb} = 5.223 \times 10^4 \text{ photons/pencil beam}.$$

The number of photons scattered backwards, $N_{back}$, assuming a density 1 g/cm³ for the organic plastic scintillator, is $$Nback := Npb \cdot \mu e \cdot N \cdot \frac{Z}{A} \cdot \Omega \cdot T$$

If $\mu_e = 50 \times 10^{-27}$ cm²/steradian/electron, $N = 6 \times 10^{23}$ atoms/atomic weight, Z=7 electrons per atom (for nitrogen), A=14 g/atomic weight, $\Omega = 5$ steradians is the solid angle (see below for calculation), and T=1 g/cm² is the thickness of the contraband, then the result is $$N_{back} = 3.917 \times 10^3 \text{ photons/pencil beam}.$$

If the thickness of the backscatter detector is $T_{det} = 5$ g/cm² and the mass absorption coefficient at 45 keV is $\mu_{det} = 0.2$ cm²/g, the average efficiency of the backscatter detector is $$\text{eff} = 1 - e^{-Tdet \times \mu det} = 0.632.$$

So the number of detected photons per pixel, $N_{detpix}$, is $$N_{detpix} = N_{back} \times \text{eff} = 2.476 \times 10^3 \text{ detected photons per pixel}.$$

Using the Nyquist theorem, the pencil beam can be sampled twice for each passage of the beam over the slot and twice as the slot moves down across the subject. Thus the pixel size, pix, at the front of the subject is one half of the pencil beam size at the front of the subject or $$pix := \frac{\sqrt{Apb} \cdot 10}{2}$$

or pix=2 mm.

Since each pixel is illuminated four times, the number of photons per pixel is the same as the number of photons per pencil beam.

To estimate the performance of the system, an object phantom is assumed to have an area $A_{phan} = 2.5$ cm², and a thickness of $d_{phan} = 0.5$ cm. It is resting on a large plate (equivalent to the soft tissue of the human body) that is $d_{sur} = 5$ g/cm² thick. This is a very challenging phantom. All materials are low Z. The number of detected backscatter photons from the phantom, $F_{phan}$, is $$Fphan := Npb \cdot \mu e \cdot N \cdot \frac{Z}{A} \cdot \Omega \cdot Aphan \cdot (Dphan + Dsur) \cdot \left(\frac{Dslit}{Dper}\right)^2 \cdot \text{eff}$$

or $$F_{phan} = 3.064 \times 10^4 \text{ photons}$$

scattered backward and detected. And the number of photons from a similar area, $A_{phan}$, of the surround, $F_{sur}$, is $$F_{sur} := Npb \cdot \mu e \cdot N \cdot \frac{Z}{A} \cdot \Omega \cdot Aphan \cdot dsur \cdot \left(\frac{Dslit}{Dper}\right)^2 \cdot eff$$

or $$F_{sur} = 2.786 \times 10^4.$$

So the number of standard deviations, $N_{SD}$, between the phantom and a corresponding area of the surround is $$NSD := \frac{Fphan - Fsur}{\sqrt{Fsur + Fphan}}$$

or $$N_{SD} = 11.517 \text{ standard deviations}$$

to see the small piece of explosive. Thus an explosive 5 mm (0.2 in) thick and 2.5 cm (1 in) on a side placed over an area of the subject with soft tissue 5 cm (2 in) thick would be seen with 11.5 standard deviations of contrast.

Figure 10:
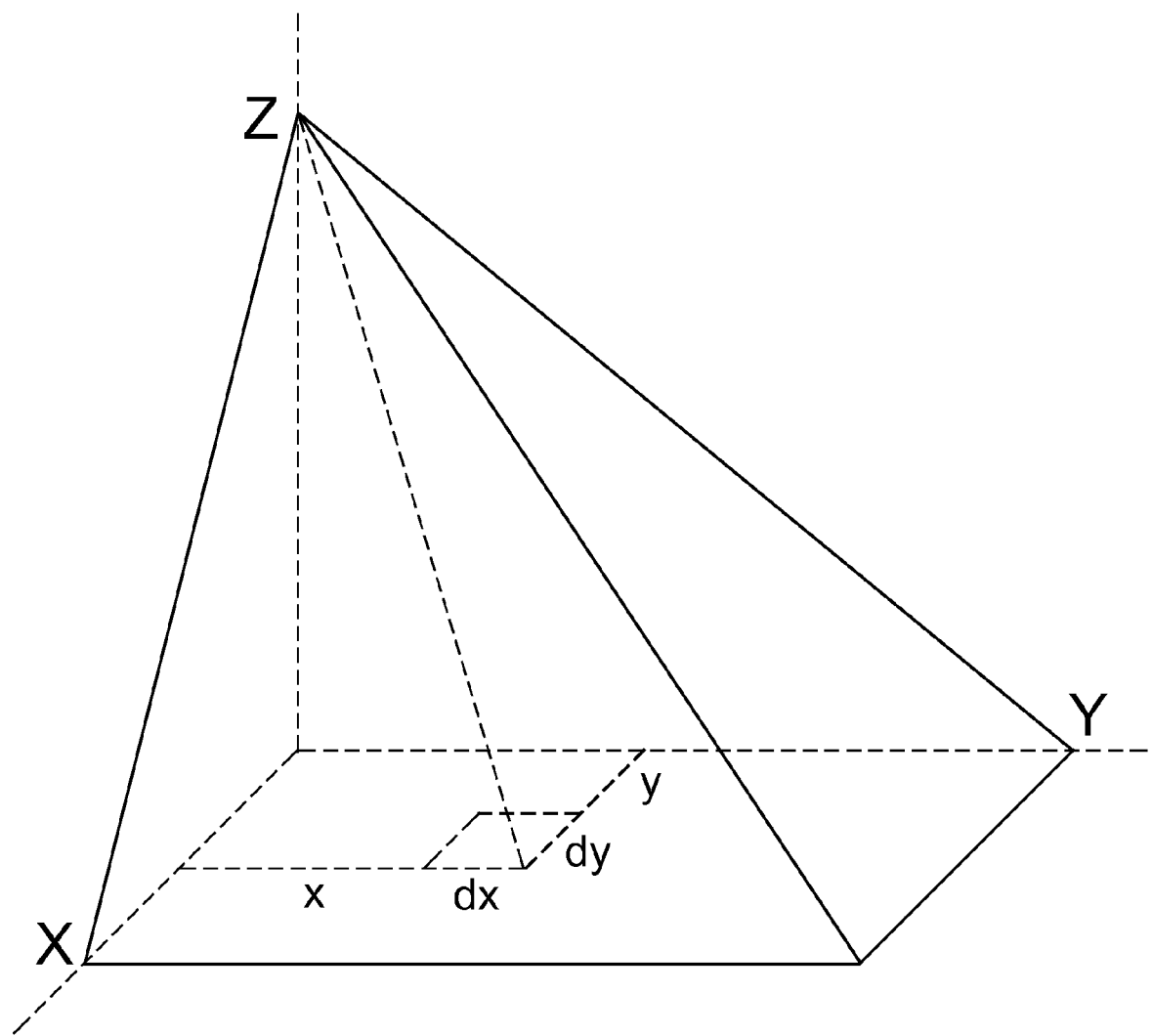
FIG. 10 is a reference diagram for the solid angle calculation.

Below is a calculation of the solid angle subtended by the point where the pencil beam hits the surface of the subject, on the backscatter detector. Referring to FIG. 10, Z=2.5 cm is the closest distance from the pencil beam impact point to the detector. x=15 cm and y=30 cm are the transverse dimensions of one quarter of the detector. $\Omega$ is the solid angle and is $$\Omega := 4 \cdot \int_0^Y \int_0^X \frac{Z}{(x^2 + y^2 + Z^2)^{\frac{3}{2}}} dx\,dy$$

or $$\Omega = 5.544 \text{ steradians}.$$

Now the width of the slit/slot that allows the flux to the person to be uniform as the pencil beam moves transversely from side to side is calculated. The cross-section of the pencil beam must increase because both the distance from the x-ray source to the slit/slot and the angle of the pencil beam with the normal to the plane of the rotating disk increase as the pencil beam moves from the center to the edge of the fixed slit and from the top to the bottom of the slot as the disk rotates. These effects are compensated for by increasing the area of the pencil beam cross-section. Preferably, one half of the correction is made by the slit and the other half is made by the slot.

The area of the pencil beam is $A_{pb}$=0.16 cm² at the person, so the minimum area of the pencil beam at the slit is $$A_{pbslitmin} = A_{pb} \times (D_{slit}/D_{per}) = 0.96 \text{ cm}^2.$$

The minimum width of the slit, $\Delta_{minslit}$, at the center of the slit for the minimum pencil beam area is $$\Delta_{minslit} = \sqrt{A_{pbslitmin}} = 0.31 \text{ cm}.$$

As indicated above, the length of the slit $L_{slit}$=24 cm, the distance from the x-ray source to the slit $D_{slit}$=12 cm, and one half of the separation angle of the rotating slots $\Phi_{max}$=45× ($\pi$/180) radians. The radial distance, R, from the axis of rotation of the disk to the end of the fixed slit is $$R = L_{slit}/(2 \sin \Phi_{max}))$$

and the radial distance, r, from the axis of rotation of the disk to the center of the fixed slit is $$r = R \cos(\Phi_{max}).$$

If R=16.971, then r=12 cm. $\Theta$ is the angle of the x-ray beam from the beam normal to the fixed slit. For ten locations, i=0 . . . 9, along the fixed slit, $$\Phi_i = 45i \times (\pi/(180 \times 9)) \text{ radians}$$

and $$\Theta_i = a \tan(r \times \tan(\Phi_i))/D_{slit}) \text{ radians}.$$

The area of the pencil beam at location i is $$A_{pbsliti} = A_{pbslitmin}/(\cos(\Theta i))^3.$$

The cube of the cosine includes a square of the cosine to take into account the increase in distance from the x-ray source and an additional cosine to take into account the angle between the pencil beam and the normal to the disk. The width of the slit at location i is $$\Delta_i = \sqrt{A_{pbsliti}}.$$

The position of location i along the slot is $$\lambda_i = r/(\cos((\Phi_i)) - r$$

and the position of location i along the slit is $$L_i/2 = D_{slit} \times \tan(\Theta_i).$$

These values for each of the ten locations i=0 . . . 9 is shown in TABLE I and graphically in FIGS. 8 and 9. Note that the increase in the area of the pencil beam from the center to the far end of the slit is (0.521/0.310)2=2.82 or nearly a factor of 3.

TABLE I

| i | $\Theta_i$ (radians) | $\Phi_i$ (radians) | $\Delta_i$ (cm) | $\lambda_i$ (cm) | $L_i/2$ (cm) |
|---|---|---|---|---|---|
| 0 | 0.0 | 0.0 | 0.310 | 0.0 | 0.0 |
| 1 | 0.087 | 0.087 | 0.312 | 0.046 | 1.050 |
| 2 | 0.175 | 0.175 | 0.317 | 0.185 | 2.116 |
| 3 | 0.262 | 0.262 | 0.326 | 0.423 | 3.215 |
| 4 | 0.349 | 0.349 | 0.340 | 0.770 | 4.368 |
| 5 | 0.436 | 0.436 | 0.359 | 1.241 | 5.596 |
| 6 | 0.524 | 0.524 | 0.384 | 1.856 | 6.928 |
| 7 | 0.611 | 0.611 | 0.418 | 2.649 | 8.402 |
| 8 | 0.698 | 0.698 | 0.462 | 3.665 | 10.069 |
| 9 | 0.785 | 0.785 | 0.521 | 4.971 | 12.000 |

Note in FIG. 7 that the cross-section of the slot 42 formed by the tungsten jaw 44 is not rectangular, but has a narrowed throat at the center. The walls 50 of the jaw 44 that form the throat are at a separation angle of $2 \times \Theta_{max}$, where $\Theta_{max}$ is the maximum angle of the x-ray beam from the beam normal to the slit/slot, as shown in FIG. 5. The purpose of this shape is so that the outside edges 52 of the slot 42 do not reduce the area of the pencil beam.

A detailed calculation has been performed to produce the x-ray backscatter flux from carbon and plastic at the two peak energies of the x-ray source, 100 KeV and 30 KeV. This calculation uses similar values for the flux as those above. The calculation uses each of the appropriate x-ray energy intervals and then sums the results. This process is known to people of average skill in the art.

Figure 11:
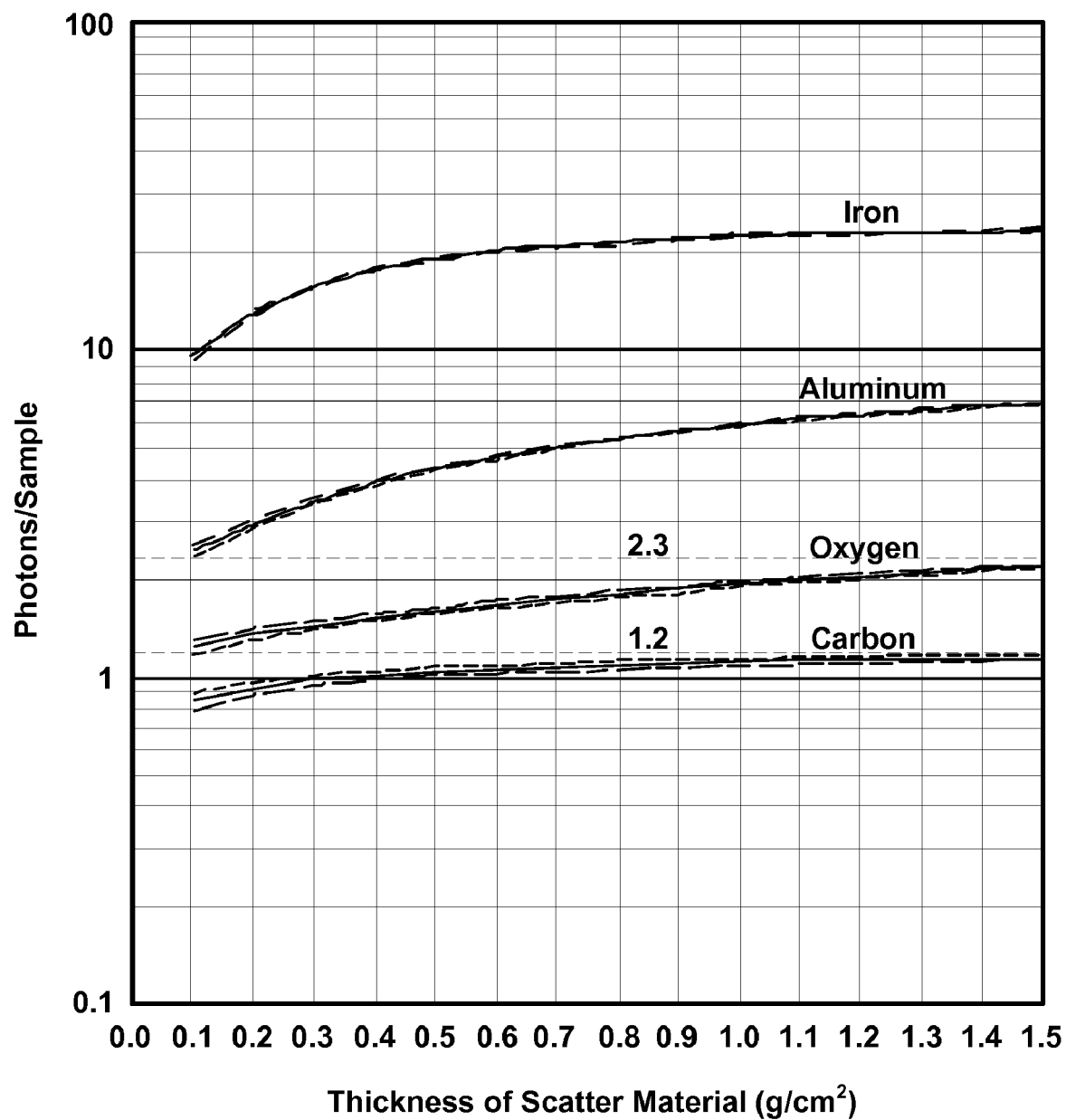
FIG. 11 is a graph showing an example final result of a scan of the present invention.

FIG. 11 shows the final result after processing by the system electronics. The ratio of the 100 KeV contribution to the backscatter flux to the 30 KeV contribution to the backscatter flux is calculated for each sample at every depth of the sample. The samples are, from the top, iron, aluminum, oxygen and carbon. Note that the separation of the curves exists for all values of the thickness of the materials, even for the oxygen and carbon samples. In FIG. 11, it can be seen that carbon is completely below the dashed line labeled 1.2, while oxygen is at or above it. It can also be seen that oxygen is completely below the dashed line labeled 2.3, while aluminum is above it. In other words, there is no doubt as to the identification of the materials, no matter the thickness of the materials up to the maximum shown. The standard deviation in the ratios is also shown in FIG. 11 and is quite small with the limits shown above and below each of the curves.

The system of the present invention employs technologies that are well-known to those versed in the art. Dual-energy x-ray sources are now common in the industry, and the algorithm for dividing two images pixel by pixel is quite simple and can be done while the data is being collected.

The present invention has application to x-ray systems used in any application where the aim is to identify materials that are not shielded significantly by overlying material. An example of another application is radiology of the skin to evaluate potential tumors. The requirement is to examine the region just below the surface of the skin behind the lesion and perhaps identify the nature of the chemistry in this region using backscatter and dual energy or even multiple energies to identify the elemental composition and thus the molecular composition, including the concentration, of different elements and molecules.

Thus it has been shown and described a method a apparatus for using dual-energy x-rays in a backscatter scan system which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A backscatter scan system for imaging a subject having a maximum width, said system comprising:
   (a) in order from back to front, an x-ray source, an x-ray blocking sheet with a slit, an x-ray blocking disk rotating about an axis perpendicular to said slit and having a plurality of radial slots that traverse said slit as said disk rotates, an x-ray detector, and an area for said subject;
   (b) the distance from said x-ray source to the plane of said subject maximum width being approximately one half said subject area maximum width;
   (c) said x-ray source emitting an x-ray cone beam to said sheet;
   (d) said slit emitting a 90° x-ray fan beam to said disk;
   (e) a slot of said plurality of radial slots emitting an x-ray pencil beam as said slot traverses said slit;
   (f) said pencil beam passing through said x-ray detector and impinging on said subject, said pencil beam having a flux magnitude at said plane;
   (g) said pencil beam traversing completely across said maximum width of said subject area;
   (h) said subject causing x-ray backscatter, a portion of said backscatter impinging on said detector to form a signal for each pencil beam; and
   (i) a processor that forms a line image from said signals from each of said pencil beams.

2. The system of claim 1 wherein said x-ray source, said sheet, said disk, and said detector form an assemblage that traverses said subject perpendicular to said pencil beam in order to form an image of said subject.

3. The system of claim 1 wherein said x-ray source emits a dual-energy x-ray cone beam having a maximum low peak x-ray energy of 30 KeV and a minimum high peak x-ray energy of 50 KeV.

4. The system of claim 1 wherein said slit has a length, a center, two ends, and a width and said slot has a length, an inner end, an outer end, and a width, and wherein said slit width increases from said center to each of said two slit ends or said slot width increases from said inner end to said outer end, the magnitude of said slit width increase or said slot width increase being such that said flux magnitude remains substantially constant at said plane as said pencil beam traverses said subject area.

5. The system of claim 4 wherein said slit width increases from said center to each of said two slit ends and said slot width increases from said inner end to said outer end, the magnitude of said slit width increase and said slot width increase being such that said flux magnitude remains substantially constant at said plane as said pencil beam traverses said subject area.

6. The system of claim 1 wherein said detector includes a plastic scintillator.

7. The system of claim 6 wherein said scintillator is curved so as to be close to the sides of said subject.

8. A method for using dual-energy x-rays to inspect a subject, said method comprising the steps of:
   (a) providing an assemblage comprising, in order from front to back, an x-ray source, an x-ray blocking sheet with a slit, an x-ray blocking disk rotating about an axis perpendicular to said slit and having a plurality of radial slots that traverse said slit as said disk rotates, an x-ray detector, and an area for said subject, wherein the distance from said x-ray source to the plane of said subject maximum width is approximately one half said subject area maximum width;
   (b) said x-ray source emitting a dual-energy x-ray cone beam to said sheet, said cone beam comprised of a low peak energy having a maximum of 30 KeV and a high peak energy having a minimum of 50 KeV;
   (c) said slit emitting a 90° x-ray fan beam to said disk;
   (d) said slot emitting an x-ray pencil beam as said slot traverses said slit;
   (e) said pencil beam passing through said x-ray detector;
   (f) said pencil beam impinging on and traversing across said subject;
   (g) said subject causing x-ray backscatter, a portion of said backscatter impinging on said detector to form a signal for each pencil beam;
   (h) forming a line image from said signals from each of said pencil beams;
   (i) translating said assemblage perpendicular to said pencil beam a plurality of times and forming a plurality of line images; and
   (j) forming an image of said subject from said line images;
   (k) whereby said low peak energy x-rays minimally penetrate said subject and differentiate low atomic number elements on the surface of said subject.

* * * * *